United States Patent [19]

Morgunsky et al.

[11] 4,191,075

[45] Mar. 4, 1980

[54] ROTARY CUTTING TOOL

[75] Inventors: Evgeny I. Morgunsky; Valery A. Sidorenko; Vladimir A. Plotnikov, all of Minsk, U.S.S.R.

[73] Assignee: Fiziko-Tekhnichesky Institut Akademii Nauk Belorusskoi SSR, U.S.S.R.

[21] Appl. No.: 961,741

[22] Filed: Nov. 17, 1978

[30] Foreign Application Priority Data

Dec. 8, 1977 [SU] U.S.S.R. .............................. 2547939

[51] Int. Cl.$^2$ ..................... B23B 29/00; B26D 1/12
[52] U.S. Cl. .................................. 82/36 R; 407/7; 407/11
[58] Field of Search .............. 407/7, 11, 40; 82/36 R, 82/1 C; 144/218

[56] References Cited

U.S. PATENT DOCUMENTS

| Re. 26,637 | 7/1969 | Vaughn | 407/40 |
|---|---|---|---|
| 2,230,455 | 2/1941 | Githens | 407/11 |
| 3,486,542 | 12/1969 | Blackwell | 144/218 |

FOREIGN PATENT DOCUMENTS

| 558905 | 9/1932 | Fed. Rep. of Germany | 82/36 R |
|---|---|---|---|
| 322234 | 2/1972 | U.S.S.R. | 82/36 R |

Primary Examiner—Harrison L. Hinson
Attorney, Agent, or Firm—Robert E. Burns; Emmanuel J. Lobato; Bruce L. Adams

[57] ABSTRACT

The disclosed cutting-tool comprises a stepped-diameter arbor with bearings supporting rotatably thereon a holder carrying the cup-shaped cutting bit. In accordance with the invention, the holder is made up of a hollow shaft and a sleeve encompassing this shaft. The sleeve is journalled adjacent to the cutting bit in one of the bearings located about the stepped-diameter arbor, said arbor having a central bore. The other bearing is accommodated within the central-bore and supports the hollow shaft likewise accommodated in the central bore of the arbor. Owing to the disclosed structure of the holder and its interconnection with the stepped-diameter arbor, sufficient rigidity of the cutting-tool, matched by its compact size is ensured.

2 Claims, 1 Drawing Figure

U.S. Patent
Mar. 4, 1980
4,191,075
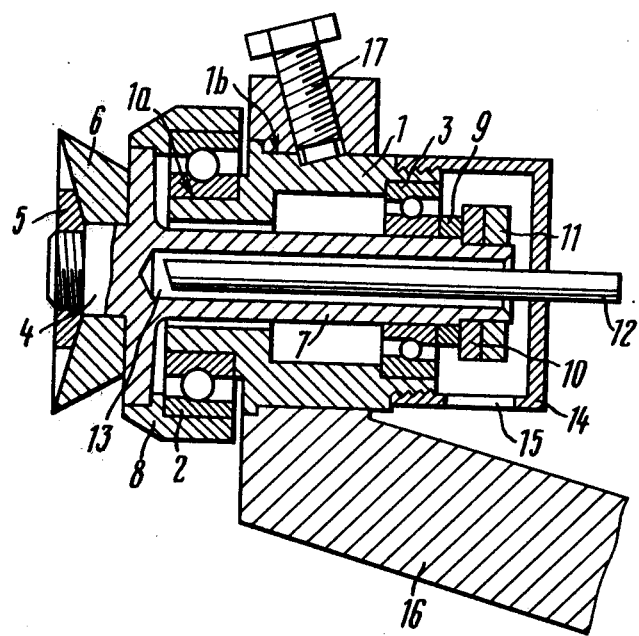

ROTARY CUTTING TOOL

FIELD OF APPLICATION

The present invention relates to working metals by cutting, and, more particularly, it relates to rotary cutting-tools.

The invention can be effectively utilized for dimensional-finishing machining of large surfaces in turning, boring, planing, shaping, milling, to replace more labour-consuming grinding operations.

Furthermore, the invention can be effectively utilized at working of hard-workable materials, such as heat-resistant and titanium alloys, stainless steels, fibre-plastic materials, etc.

BACKGROUND OF THE INVENTION

There are known rotary cutting-tools including a cup-shaped cutting bit mounted on a holder journalled in the housing of the cutting-tool in bearings. However, their common drawback is their insufficient rigidity. To enhance the rigidity, it is necessary to incorporate in the cutting-tool bearings of a high load-bearing capacity and high durability, which bearings are of considerable dimensions, whereby the size of the housing with aid of which the cutting-tool is secured in the tool carrier is increased correspondingly. Therefore, alongside with the enhanced rigidity of the cutting-tool, the amount of metal therein is increased, and its compact size is affected. The compactness of the cutting-tool, however, is of particular importance in such machining techniques as milling and boring.

There is further known a rotary cutting-tool (see, for example, the SU Inventor's Certificate No. 222,120) featuring a compact structure and including a stepped-diameter arbor with bearings supporting a holder with a cup-shaped cutting element or bit.

The holder is made in the form of an outer sleeve having its internal tapering surfaces engaging rolling bodies (either balls or rollers) arranged coaxially with respect to said arbor, the latter having a tail portion secured in the tool head or holder.

A disadvantage of this known cutting-tool disclosed in the SU Inventor's Certificate No. 222,120 is its insufficient rigidity affected, first and foremost, by the fact that the bearing means supporting the holder are mounted on the cantilever portion of the arbor. The same fact would not enable to have the optimum spacing of the bearing means, which would have provided for adequate rigidity and durability of the bearing assembly. To reduce the cantilever portion of the arbor, the bearings have to be arranged practically next to each other.

The insufficient rigidity of the cutting-tool results in the cutting edge being urged away from the surface being worked in the course of the machining operation, and in cases when the machining allowance is non-uniform, e.g. in cases of radial runout of the workpiece, the extent of this urging-away is likewise non-uniform, which drastically affects the finishing quality and the machining accuracy. Moreover, the insufficient rigidity of the cutting-tool brings about inadequate vibration-resistance of the machining process, as a whole, which curbs down the productivity and affects the stability of the cutting-tool, the latter being excessively susceptible to varying cutting conditions. On the other hand, the range of the variation of the cutting duty whereat the process is conducted without vibration is exceedingly narrow, while the probability of the generation of vibration is high. With vibration generated, not only is the accuracy and surface-finishing quality of the machining operation affected, but the stability of the cutting-tool sharply declines, and its service life is curtailed, with intensive crumbling of the cutting edge of the tool. Thus, the assets of the cutting-tool of the prior art, as far as the high productivity, surface-finishing quality and machining accuracy are concerned, are definitely limited.

To the abovediscussed drawbacks of the cutting-tool of the prior art one has to add the fact that its structure has no provisions for positive withdrawal of heat from the cutting portion and bearings heating up in operation. The most primitive cooling technique alone is available, namely, the feed of a cooling fluid directly onto the cutting bit. However, this technique is of but limited applicability on account of its poor sanitary standards and the intensification of the crumbling of the hard-alloy cutting portion of the cutting-tool.

BRIEF DESCRIPTION OF THE INVENTION

It is the general object of the present invention to provide a rotary cutting-tool, which will combine adequate rigidity with compact structure.

This and other objects are attained in a rotary cutting-tool comprising a stepped-diameter arbor with bearings and a holder with a cup-shaped cutting bit, journalled in said bearings. In accordance with the invention, said holder is made as a hollow shaft with a sleeve encompassing this shaft and journalled adjacent to said cutting bit in one bearing arranged on the external surface of said stepped-diameter arbor, said arbor having a central bore accommodating the other bearing supporting said shaft accommodated in said central bore of said arbor.

Owing to the herein disclosed structure of the cutting-tool, the length of the cantilever-like outreach of the cutting portion is reduced, being defined as it is, unlike that in the structure of the prior art, by the width of a single bearing instead of two.

The spacing of the bearings are selected to provide the maximum attainable rigidity at given dimensions (preferably, this spacing is at least two to three times greater than the length of the cantilever portion). In the structure of the prior art this condition is unattainable, because there the increasing of the spacing increases the length of the cantilever portion accordingly, which drastically affects the rigidity of the cutting-tool.

The arrangement of the most loaded bearing, i.e. that adjacent to the cutting bit, about the external surface of the stepped-diameter arbor enables to use for this function a bearing of a larger size, and, hence, of increased rigidity and durability. It should be noted that this feature practically does not change the size of that portion of the arbor which is secured in the tool carrier. With the diameter of the mounting portion of the holder on the bearing being in excess of the diameter of the cup-shaped cutting bit, the accuracy of the rotation of the cutting edge is enhanced, which improves the machining accuracy and surface-finishing quality.

The herein disclosed structure of the rotary cutting-tool, in addition to the abovesaid, facilitates the provision of an arrangement for positive heat withdrawal from the cutting bit and bearings with aid of a coolant supplied through the hollow shaft, which improves the stability and productivity of the cutting-tool.

In combination, the abovedescribed novel features enable to have a cutting-tool of adequate rigidity, while retaining its compact size, which, in its turn, broadens the field of production applicability of the cutting-tool, as far as its stability and productivity, machining accuracy and surface-finishing quality are concerned.

It is expedient from the operational point of view that the external surfaces of the stepped-diameter arbor should be eccentric relative to one another. Then the positioning of the apex (i.e. the point of the cutting edge corresponding to the maximum penetration into the material being worked) of the cutting-tool relative to the axis of the centres of the associated machine-tool can be performed by simple rotation of the stepped-diameter arbor about the geometrical axis thereof.

BRIEF DESCRIPTION OF DRAWING

Said and other objects and advantages of the present invention will become apparent from the following description of the embodiment thereof, with reference to the accompanying drawing showing a longitudinal sectional view of a cutting-tool embodying the invention.

DESCRIPTION OF PREFERRED EMBODIMENT

There is disclosed a rotary cutting-tool including a stepped-diameter arbor 1 with bearing means supported thereby. These bearing means, e.g. two radial-thrust ball-bearings 2 and 3 have journalled thereon a holder 4 with a nut 5 securing a cup-shaped cutting element or bit 6 on the holder 4.

In accordance with the invention, the holder 4 is made up of a hollow shaft 7 and a sleeve 8 encompassing at least partly this shaft 7. The sleeve 8 is journalled on the bearing 2 adjacent to the cutting bit 6, mounted about the external surface 1a of the stepped-diameter arbor 1, the latter having a central bore. The hollow shaft 7 is mounted in the other bearing 3 accommodated within the central bore of the arbor 1.

In the herein described embodiment the adjustment of the tensioning or preloading of the bearings 2 and 3 is effected with aid of a thrust ring 9 and nuts 10 and 11. To simplify the operation-wise adjustment of the cutting-tool, the external surfaces of the stepped-diameter arbor 1 are eccentric relative to one another.

To provide for positive and efficient heat withdrawal from the bearings 2 and 3 and from the cutting bit 6, there is provided a tube 12 running within the hollow shaft 7 at an annular spacing 13 from the internal wall thereof. The tube 12 is secured in a cover 14 with an opening 15 for communicating the internal space of the shaft 7 with the cooling system (not shown) of the associated machine-tool.

The rotary cutting-tool is secured in the tool carrier 16 with a screw 17.

The herein disclosed rotary cutting-tool is operated, as follows.

Prior to a machining operation, the cutting-tool with its carrier 16 is mounted in the tool head or rest (not shown) of the machine-tool. From the cooling system of the machine-tool the coolant is supplied into the tube 12, with the coolant flowing through the annular gap between the tube 12 and the internal wall of the hollow shaft 7, and through the opening 15 in the cover 14 back into the cooling system of the machine-tool.

The cup-shaped cutting bit 6 of the cutting-tool is brought against a workpiece (not shown for convenience sake), whereafter a test pass is made; a vernier or other appropriate device is operated to adjust the cutting depth; the automatic feed of the machine tool is engaged; and the workpiece is machined.

When the cutting edge is resharpened, its diameter decreases. To set the apex of the cutting-tool to the required height relative to the line of the centres of the machine tool, the arbor 1 is rotated in the socket of the tool carrier 16.

The herein disclosed cutting-tool is compact, has little metal in its structure and offers adequately high rigidity providing for vibration-proof cutting process, as a whole, and thus enhancing the stability and productivity of the cutting-tool, the machining accuracy and the surface-finishing quality. The positive cooling of the bearings and of the cutting bit reduces the cutting temperature and additionally enhances the stability of the cutting-tool and prolongs the operational life of its bearings.

What we claim is:

1. A rotary cutting-tool comprising: a stepped-diameter arbor having a central bore; a bearing accommodated on said stepped-diameter arbor; another bearing accommodated within the central bore of said stepped-diameter arbor; a cup-shaped cutting bit; a holder carrying said cup-shaped cutting bit and comprising a hollow shaft accommodated in the central bore of said stepped-diameter arbor, said shaft being journalled in said bearing accommodated within the central bore of said stepped-diameter arbor, and a sleeve encompassing said hollow shaft and journalled adjacent to said cutting bit in said bearing accommodated on said stepped-diameter arbor.

2. A rotary cutting-tool as set forth in claim 1, wherein the stepped portions of said stepped-diameter arbor are eccentric relative to one another.

* * * * *